United States Patent [19]

Syme

[11] 4,367,725

[45] Jan. 11, 1983

[54] WOOD AND COAL BURNING HEATING METHOD AND APPARATUS

[75] Inventor: Duncan C. Syme, Chelsea, Vt.

[73] Assignee: Vermont Castings, Inc., Randolph, Vt.

[21] Appl. No.: 125,335

[22] Filed: Feb. 28, 1980

Related U.S. Application Data

[63] Continuation-in-part of Ser. No. 86,673, Oct. 19, 1979, Pat. No. 4,279,238.

[51] Int. Cl.³ .............................................. F24C 1/14
[52] U.S. Cl. .................................. 126/77; 126/15 R; 126/126; 126/130
[58] Field of Search .................. 126/130, 131, 77, 83, 126/15 A, 15 R, 112, 146, 163, 193, 126

[56] References Cited

U.S. PATENT DOCUMENTS

| | | | |
|---|---|---|---|
| 698,800 | 4/1902 | Cahoone | 126/77 |
| 714,517 | 11/1902 | Posey | 126/130 |
| 925,570 | 6/1909 | Eckert | 126/77 |
| 1,136,615 | 4/1915 | Rice | 126/77 |
| 1,211,236 | 1/1917 | Robinson | 126/77 |
| 1,326,812 | 12/1919 | Waggoner | 126/130 |
| 1,742,992 | 1/1930 | Hoffman et al. | 126/77 |
| 2,177,573 | 10/1939 | Kormendi | 126/83 |
| 2,400,352 | 5/1946 | Higley et al. | 126/83 |
| 2,400,900 | 5/1946 | Agricola | 126/77 |
| 2,556,864 | 6/1951 | Fagan | 126/83 |
| 4,113,059 | 3/1977 | Andrews | 126/131 |
| 4,117,826 | 10/1978 | Bette | 126/146 X |
| 4,147,153 | 4/1979 | Buckner | 126/121 |

*Primary Examiner*—Larry Jones
*Attorney, Agent, or Firm*—Kenway & Jenney

[57] ABSTRACT

A heating apparatus capable of efficiently burning both coal and wood has removable restriction elements for varying the rate of flow of air from an inlet port in the heating apparatus to a fuel holding combustion chamber. The restriction elements are positioned in the air supply path or paths from the inlet port to the fuel holding combustion chamber.

18 Claims, 12 Drawing Figures

WOOD AND COAL BURNING HEATING METHOD AND APPARATUS

This is a continuation-in-part application of my application Ser. No. 86,673, filed on Oct. 19, 1979, and entitled Woodburning Heating Apparatus, now U.S. Pat. No. 4,279,238, issued July 21, 1981.

BACKGROUND OF THE INVENTION

This invention relates generally to a heating apparatus and method and in particular to an airtight heating apparatus and method adaptable for efficiently burning both coal and wood.

As the price of oil and gas fuels increases, more and more households are turning to wood burning and coal burning apparatus to provide at least a portion and in some circumstances all of the heat for a dwelling. In some instances fireplaces are used. However the fireplace is an inefficient heater; and in response to the increased demand for wood burning and coal burning heating apparatus, a myriad of free standing stoves have been commercially designed and manufactured.

One class of particularly efficient stoves are those stoves which have controlled air inlets. These stoves, often termed airtight, can have many different configurations. Two of the airtight wood burning stoves, which are particularly successful, are capable of operating using horizontal or updraft combustion. They are the Vigilant TM and the Defiant TM, both manufactured by Vermont Castings, Inc., Randolph, Vt., the assignee of this application. The Vigilant and the Defiant are both relatively large heating apparatus having heat outputs, at maximum burning capacity, of about 45,000 and 55,000 BTU's respectively. In addition to the wood burning stoves which have recently become quite popular in today's era of high oil and gas prices, many homeowners, who have grown weary of the multistep procedure of buying wood, perhaps splitting and stacking it, and then bringing it into the house, have turned to coal burning stoves as an alternative method and apparatus for heating the house. These stoves, long in use on the European continent, are designed solely for burning coal, many of them being well controlled and efficient.

A stove design able to efficiently burn either coal or wood, without a major structural change has not yet been created. The primary reason for this apparent gulf in the stove art is the vastly different operating parameters which relate to the many differences between the two different fuels, and the resulting inability to marry, in one apparatus, a structure efficient for both fuels.

An object of this invention is therefore an airtight heating apparatus and method having the capability of efficiently burning either wood or coal without major structural changes, and which is long lasting, reliable, practical and efficient. Other objects of the invention are a heating apparatus and method wherein the user can service the apparatus and convert it easily from a coal burner to a wood burner (and vice versa), and which can be reliably manufactured with minimum cost.

SUMMARY OF THE INVENTION

The invention relates to a heating apparatus having a heat conducting frame member with front, side, and back vertical wall panels, a top panel, and a bottom panel, which together, enclose a defined volume. The invention features at least one removable plate which defines, in combination with at least one wall panel and a fireback, a first air supply network for providing air from an inlet port in the frame member to a fuel holding combustion chamber.

The air supply network has a first enclosed elongated path for supplying air at a first side of the apparatus to the fuel holding combustion chamber. The frame member, and preferably the top panel and the side wall panel at a back portion of the apparatus, is adpated to define a flue gas exit aperture in gaseous communication with the combustion chamber.

The apparatus further features a removable restriction in an interfering relationship with the first elongated path at a position interior of the frame member for restricting the otherwise available quantity of air flow through the air supply path. This is accomplished by restricting the available air supply path cross-sectional area. Preferably, the restriction element is integral with the plate.

With the plate in place, the apparatus operates efficiently as a wood burning stove. When the plate is removed, significant additional air can be supplied to the now larger primary combustion chamber and, with the addition of a grate, the stove operates efficiently as a coal burning apparatus.

The invention further features a removable restriction which is a plate-like element, integral with the plate, for controlling the flow through the first elongated path. In a preferred embodiment, the air supply network further has a second elongated path defined by and between a second plate, the fireback, and the frame member for supplying air at a second side of the apparatus. A second plate-like assembly, for controlling the passage of air in the second enclosed path, is provided integral with at least the second plate and preferably also with an associated baffle structure.

Another aspect of the invention relates to a method for burning, in one configuration of the apparatus, coal, and in a second configuration of the apparatus, wood. The method features the steps of providing an inlet port in the frame of a heating apparatus having a cross-sectional area sufficiently large to provide the air required for the heating apparatus to efficiently burn coal; directing that air to a fuel combustion chamber wherein the coal can be efficiently burned; and removably inserting into air supply paths to the fuel combustion chamber, at positions interior of the heating apparatus, removable flow restriction elements for limiting and controlling the rate at which air can be supplied to the fuel combustion chamber when the fuel combustion chamber is employed for burning wood.

BRIEF DESCRIPTION OF THE DRAWINGS

Other objects, features, and advantages of the invention will be apparent from the following description of a preferred embodiment taken together with the drawings in which.

DESCRIPTION OF A PREFERRED EMBODIMENT

Figure 1:
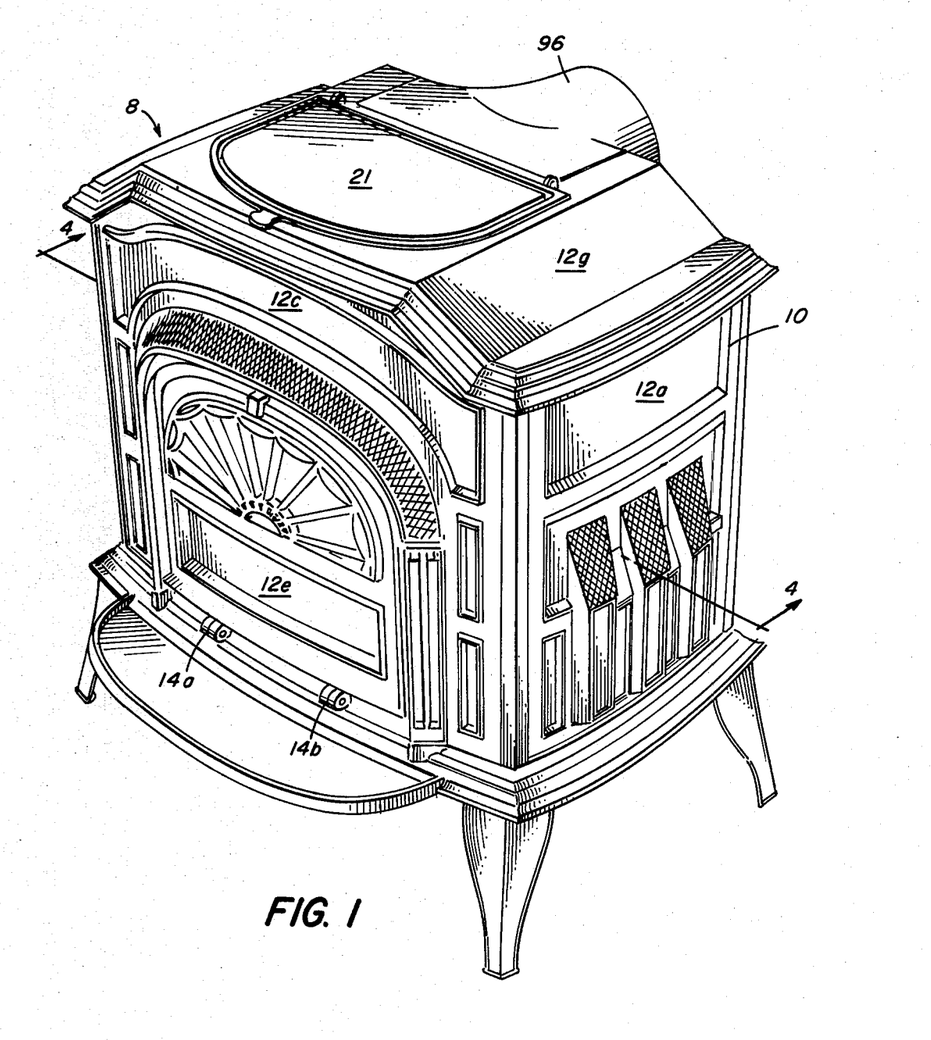
FIG. 1 is a front perspective view of a preferred embodiment of a heating apparatus according to the invention.
Figure 2:
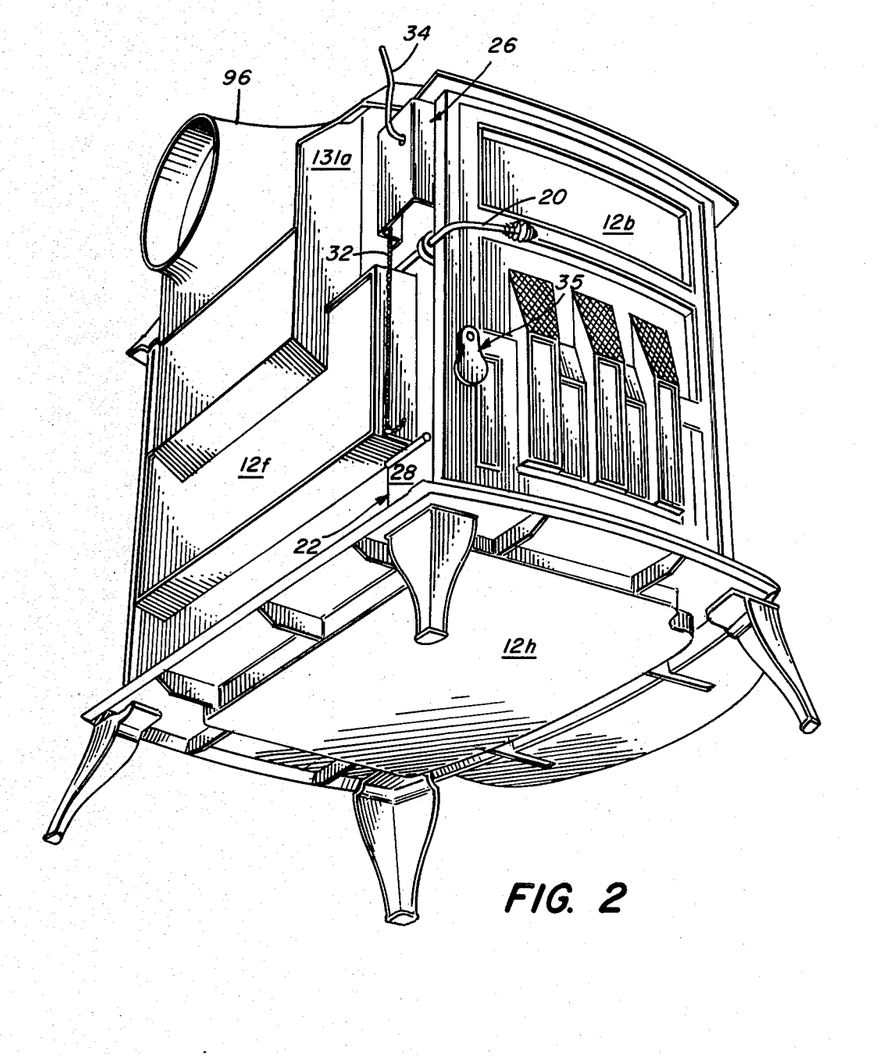
FIG. 2 is a rear perspective view of the preferred embodiment of the heating apparatus according to the invention.

Referring to FIGS. 1 and 2, a heating apparatus 8 has an exterior frame member 10 preferably comprised of a heavy-duty cast iron. The sides 12a, 12b, front 12c with door 12e, back 12f, top 12g, and bottom 12h of the frame member are joined in a channeled construction to form an integral, air-tight unit. The front pivoting door 12e, which pivots down on hinges 14a, 14b, allows the heating apparatus to be opened from the front for both loading wood or coal into a primary combustion chamber 16 (FIG. 3) and, for example, for viewing the wood fire when the heating apparatus is used as a fireplace. In its closed position, door 12e seals against a gasketing material such as an inert mineral fiber woven rope sealing member. A damper 18 (FIGS. 3 and 4) whose position is controlled by a handle 20 allows the heating apparatus to be operated in an updraft combustion configuration (like a fireplace) for burning coal or wood, or in a horizontal combustion configuration for burning wood as described in more detail below. Illustrated top member 12g supports a pivotable cast iron cooking surface 21.

Figure 3:
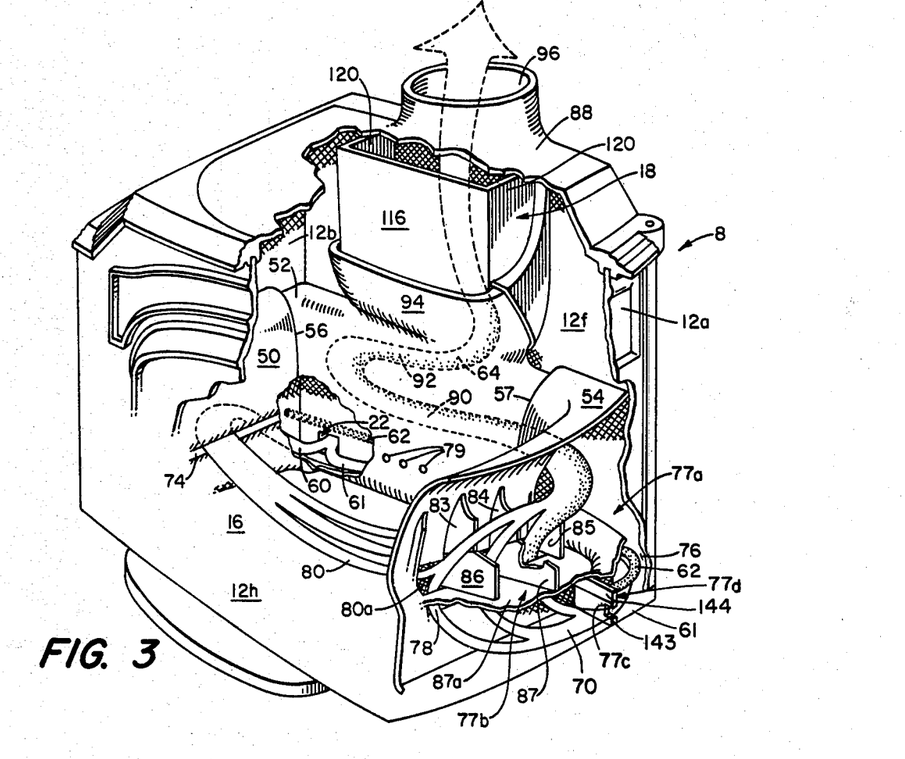
FIG. 3 is a partially cut away, somewhat schematic perspective view of the preferred embodiment of the heating apparatus according to the invention in a wood burning configuration.

The apparatus will first be described in the configuration in which it is an efficient wood burning apparatus. Referring to FIGS. 2 and 3, air is supplied to the primary combustion chamber 16, through an inlet port 22 as described in more detail below. Inlet port 22 is thermostatically controlled by a thermostat 26 which operates a pivoting draft shutter 28, removably covering an aperture in the back frame member 12f. Thermostat 26 is for example a coil of bimetallic material connected to shutter 28 by a flexible chain 32. Heating apparatus 8 also has a control lever 34 for regulating thermostat 26. A manually controlled night air inlet port 35 in side member 12b provides the air inlet for air supplied to the primary combustion chamber 16 especially for night or low level operation.

Figure 4:
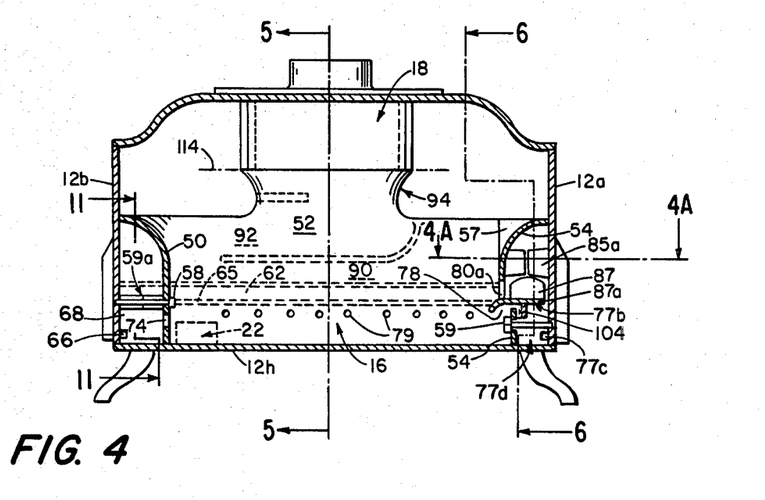
FIG. 4 is a cross-sectional view through the center of the apparatus along the lines 4—4 of FIG. 1.
Figure 6:
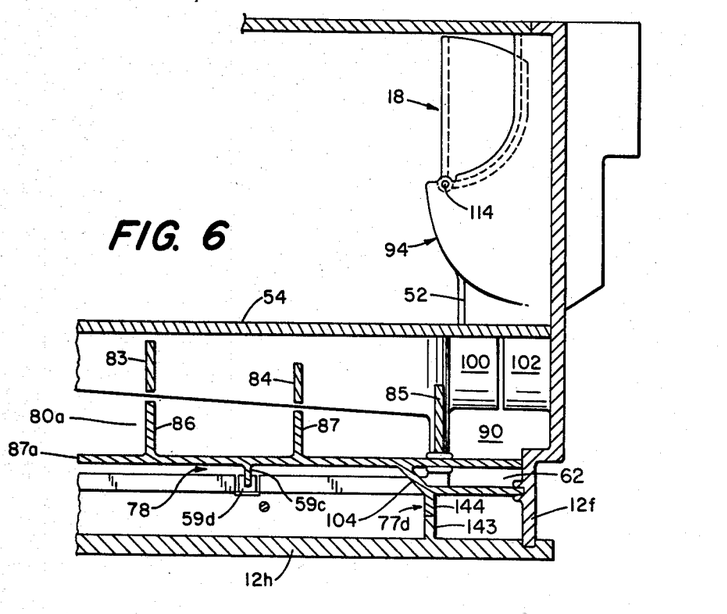
FIG. 6 is a cross-sectional view along lines 6—6 of FIG. 4.

Referring to FIG. 3, the illustrated heating apparatus 8 has a removable, left wear plate 50, a removable fireback 52, and a removable right wear plate 54. Wear plates 50 and 54 and fireback 52 are supported by bottom panel 12h and are contoured so that the wear plates and fireback 52 engage along seams 56, 57 in a substantially airtight fit. Wear plates 50, 54 thus prevent lateral movement of the fireback away from its engaging contact with back panel 12f as described in more detail below. The longitudinal position of the wear plates with respect to the side panels is fixed by screw connections 58, 59 (FIG. 4). A support member 59a attached to wear plate 50 engages a boss 59b of side wall 12b to prevent excessive tightening force at screw connections 58 from destructively damaging or distorting the wear plate. A corresponding structure employing member 59c from buffer plate 82a (FIG. 6) and a protruding member 59d from wear plate 54 prevents distortion of plate 54.

Wear plates 50 and 54 are fireback 52 are removable from the interior of the apparatus 8 through the front opening. These elements are more subject to deterioration because of their close proximity to the intense heat of the wood fire in the primary combustion chamber 16. They may therefore be replaced by the user without having to disassemble the entire stove frame member 10. In addition wear plates 50 and 54 and fireback 52 help protect the outside frame walls of the heating apparatus from undue wear resulting from exposure to the primary combustion chamber heat.

Figure 5:
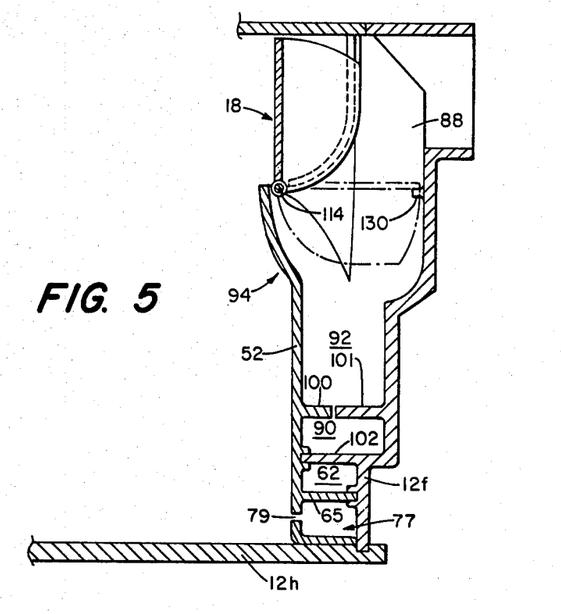
FIG. 5 is a cross-sectional view along the lines 5—5 of FIG. 4.
Figure 11:
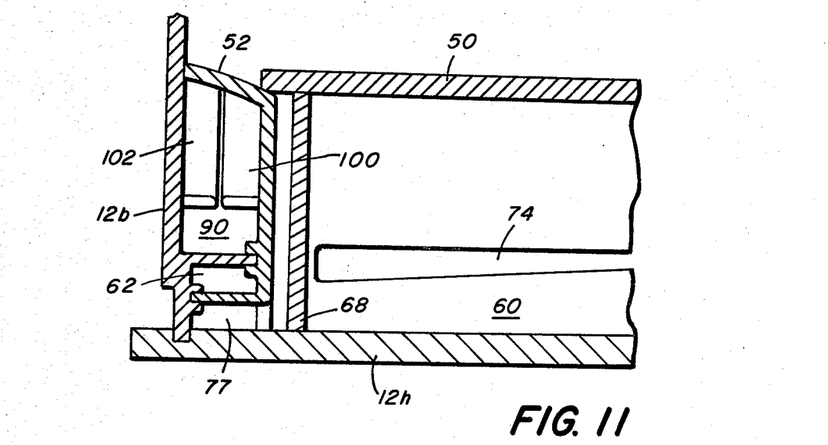
FIG. 11 is a cross-sectional view along lines 11—11 of FIG. 4.

Wear plates 50 and 54 and fireback 52, in combination with side walls 12a and 12b and back wall 12f delimit, for wood burning operation, the space in which a primary air supply path 60, a primary/secondary air supply path 61, a night air supply path 62, and a circuitous, combusted products flame path 64 are defined. The primary air supply path 60 and the primary/secondary air supply path 61 each begin at the thermostatically controlled inlet port 22. Air entering through port 22 thus divides at the enclosure side of the port into the two paths 60 and 61. The primary air supply path 60 passes, in the illustrated embodiment to a left side of the heating apparatus 8, through a notch 66 in a restriction assembly 68 (FIG. 11), and enters the primary combustion chamber 16 through a tapered slot 74 in wear plates 50. The slot is tapered to provide a desired air flow rate across the entire length of the slot and has a wider opening toward the back of the apparatus. The primary path through which these primary gases are directed is defined by wear plate 50 and a portion of fireback 52, in combination with the outside wall panels of the heating apparatus and a horizontal baffle member 65 (described in connection with FIG. 5). The primary/secondary air supply gases from air inlet port 22 are directed toward the right hand portion of the apparatus through a bottom elongated enclosure 77 (FIG. 5) formed by fireback 52 in combination with the rear panel 12f and the horizontal baffle member 65. This directed air path "turns the corner" at the back, right hand portion 77a of the apparatus and is directed beneath a multiple baffle plate 77b, through a notch 77c in a restriction assembly 77d, and then through a slot 78 into the primary combustion chamber 16.

The oxygen rich air directed from inlet 22 to primary/secondary path 61 serves two functions. A first portion of the air exits from path 61 through holes 79 in fireback 52. These oxygen rich preheated gases (heated by contact with the fireback) contribute to primary combustion in the primary combustion chamber 16. The remaining preheated, oxygen rich gases, which turn corner 77a, pass into the primary combustion chamber where they substantially immediately combine and mix with combusted gases 80 which are exiting through wear plate exhaust slot 80a. Slots 78 and 80a are thus formed by dividing the aperture in wear plate 54 by plate 87a. Thereby, a portion of the primary combustion chamber 16 adjacent the slot opening 78 in wear plate 54 becomes, in effect, a secondary combustion chamber. The combusted gases exiting through openings 80a are controlled in part by baffles 83, 84, 85 of wear plate 54, three corresponding baffles 83a, 84a, 85a integral with side 12a and baffles 86, 87 of baffle plate 77b (as described below), and are guided along the long circuitous internal flame path 64 to an exit aperture 88 in the frame structure.

Figure 4A:
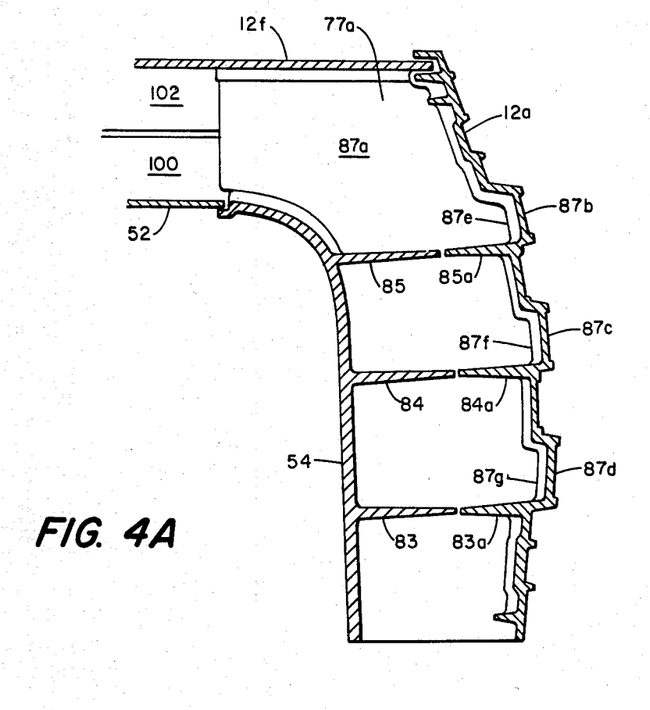
FIG. 4A is a cross-sectional view taken along lines 4A—4A of FIG. 4.

As the combusted gases 80 exit through slot 80a, their natural tendency is to bunch together and impinge directly upon side wall 12a. This effectively concentrates the heat of the combusted gases on side wall 12a and, at the area of impingement, can turn the wall a cherry red color. Possible deterioration and breakage of wall 12a can follow. This is due to the close proximity of wall 12a and wear plate 54. To better channel the gases across the entire length of the slot 80a, to provide more uniform heating throughout the volume between wear plate 54 and side wall 12a, and to avoid overheating, the baffle system comprising baffles 83, 84, 85, 86, 87 and the three baffles integral with side wall 12a, is provided. The height of these baffles above plate 87a, is proportional to the expected exhaust flow around the baffle. In addition, outward projections 87b, 87c, 87d (FIG. 4A) provide voids or pockets 87e, 87f, 87g of stagnant air which effectively provide a boundary air layer which insulates the hottest portion of the exhaust gases from impinging directly upon side wall 12a. This structure effectively eliminates the concentration of gases against and hence possible overheating of side wall 12a.

The long internal flame path which begins substantially at slot 80a of wear plate 54 directs the combusted gases exiting chamber 16 back around the corner 77a, along a first left hand directed lower path 90, to a second right hand directed upper path 92, and then upward behind a cup shaped member portion 94, of fireback 50, past damper 18 and through the flue collar 96 to an exhaust pipe not shown. The flue collar connection enables the collar 96 to provide either a rear exiting or a top exiting configuration. The elements which define upper and lower paths 90, 92 are baffle members 100, 101, and 102 (FIG. 5) formed by mating elements from the rear panel 12f and fireback 52. These elements provide the substantially sealing relationship to guide the gaseous products of combustion along the flame path to the cup shaped member 94. The cooperating structure of the damper 18, cup shaped member 94, and the exit opening 88 is described in detail further below.

The night air supply path 62 extends from inlet port 35 in side 12b, across the back of the stove, and around corner 77a to slot 78. This path is directed to a portion of slot 78 below plate 87a and terminates after about one inch of travel (in the illustrated embodiment) along the lower side of baffle plate 87a. The night supply path, defined substantially by baffle elements 65, 102 and upwardly turned member 104 (FIGS. 4, 5, and 6), enables a low level of operation to take place, for example, when damper 28 is closed.

The heating apparatus thus far has been described and depicted operating in the horizontal combustion mode wherein combusted gases exit through the long internal flame path past a vertically positioned damper 18 to an exit aperture 88. The apparatus 8, according to the invention, however, is designed to be both a horizontal combustion apparatus wherein the damper 18 is in a substantially vertical position as shown in FIG. 3, and also an updraft combustion apparatus (similar to fireplace operation) in which damper 18 is pivoted about a longitudinal pivot axis 114 (FIGS. 4, 5, and 6) so that the main plate element 116 pivots downward to a substantially horizontal position as shown in dotted outline in FIGS. 7 and 8. This capability of operating in either an updraft or a horizontal combustion mode requires that the apparatus be structured to provide a sealing relationship between the damper and the flame path in the horizontal combustion mode of operation so that gases from the primary combustion chamber are blocked from exiting the apparatus directly through exit aperture 88; that is they must exit through the circuitous flame path. Similarly, in the updraft combustion mode of operation, the apparatus structure provides a substantially sealing relationship with a now horizontally directed damper to prevent gases from the circuitous flame path from exiting through exit aperture 88.

Figure 7:
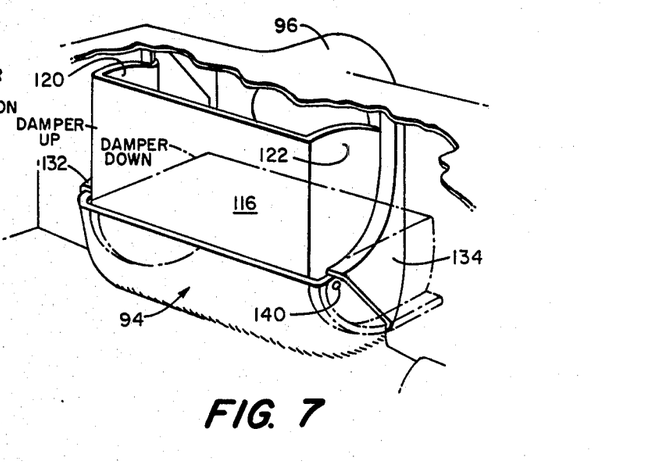
FIG. 7 is a perspective detail view of the damper structure.
Figure 8:
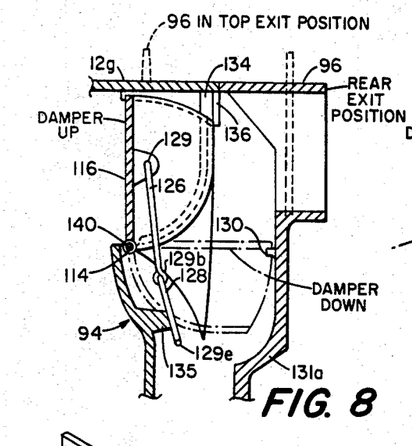
FIG. 8 is an end cross-sectional view of the damper-frame structure.
Figure 9:
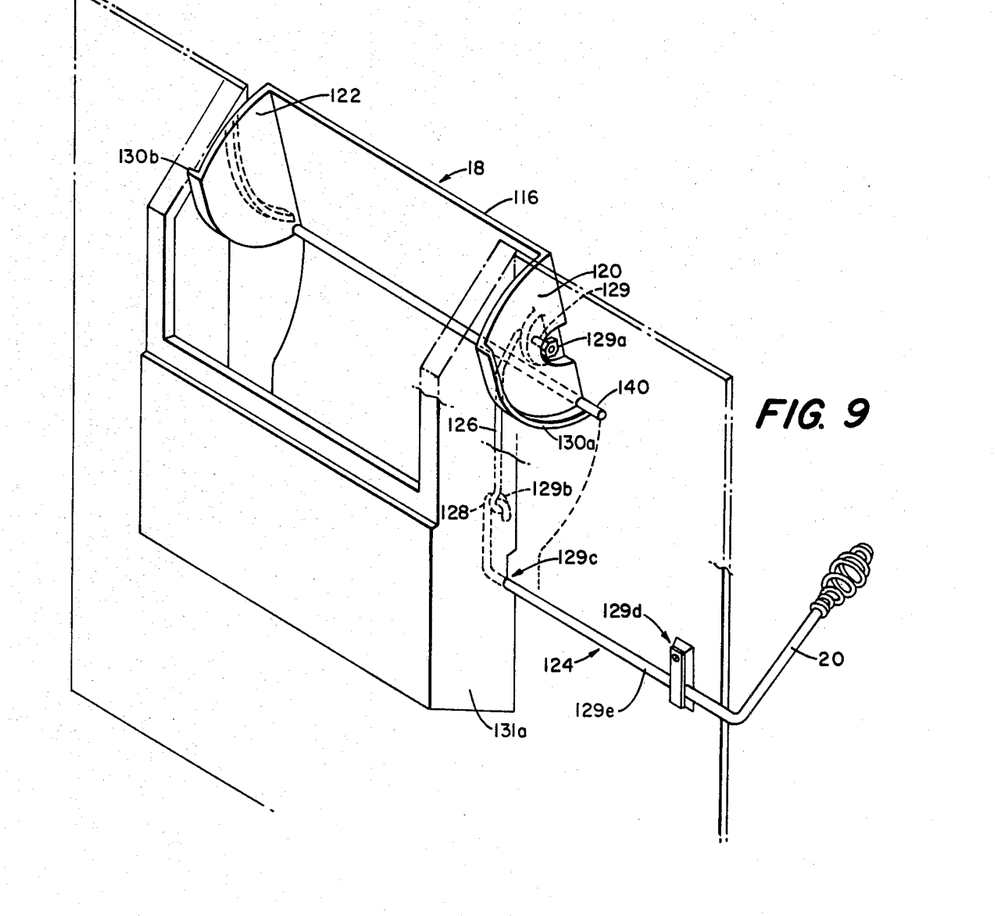
FIG. 9 is a detailed perspective, partially schematic, view of the damper-handle linkage.

Referring now to FIGS. 7, 8, and 9, the damper 18 is designed to be removable from the apparatus without dismantling the frame. Thus the damper does not extend the full width of the apparatus. Damper 18 has the main pivoting panel member 116 and ear panel members 120, 122. The damper 18 and top and back frame panels are thus designed so that in its extreme positions, the damper engages other elements of the apparatus to provide the desired sealing relationships when the damper is vertical or horizontal (as described in more detail below).

The position of damper 18 is controlled by an articulated linkage 124 (FIG. 9) which provides, in combustion with damper 18, a resistance against movement of the damper in the horizontal combustion mode (damper vertical). Referring to FIG. 9, the linkage has two elements, the handle member 20 and a link member 126 connected between end portion 128 of handle 20 and damper 18. The connection of the link member provide freely pivoting motion between the link and both the handle and the damper.

A pivotal connection 129 is provided at the damper by a retaining nut 129a threaded onto a right angle bent portion of link 126. The bent portion passes through damper ear member 120 along a pivot axis parallel to the damper pivot axis 114. The connection at end portion 128 is made, in the illustrated embodiment, by passing a U-shaped end of handle 20 through an eye 129b of link 126. Other connecting structures could be employed. Handle 20 is structured to pass through an opening 129c in rear panel 12f (sealed by protruding member 132) and is supported by the rear panel by capture hardware 129d. Illustrated portion 129e of handle 20 thus rotates on an axis parallel to the damper pivot axis 114.

Damper 18 is limited in its downward movement (to the horizontal operating position) by a protruding member 130 (FIG. 8) and in the horizontal position the damper panel 116 rests on and is supported by member 130. Upward movement of damper 18 (to the vertical position) is limited by engaging contact of damper flanges 130a, 130b (FIG. 9) with corresponding inwardly directed plate protrusions 132, 134. In reaching the vertical position, link 126 and handle end portion 128 pass an aligned position, wherein they are substantially parallel, so that thereafter, movement urged by damper 18, from the vertical position is resisted by engagement of end portion 128 with the protruding member 135.

The unique damper construction advantageously uses the minimal volume available in a stove wherein a vertical or a horizontal flue gas exit can be employed and wherein the damper in intended to be removable. A full width damper construction which might typically hinge or penetrate in the main frame members undesirably wastes available space in the primary combustion chamber and further does not provide a damper element which is easily removable without dismantling the frame. By providing a reduced width damper, however, in a stove which provides both a rear exiting as well as a top exiting flue gas exit capability, the damper panel 116 must be moved inward, from an otherwise normal position (wherein, in the horizontal position, it blocks the flame path and in the vertical position it seats adjacent protruding section 131a of back panel 12f) toward the front of the stove. This movement provides clearance for the flue collar in its top exiting state. However, in this configuration, inwardly directed plate protrusions 132, 134 must be provided, but these protrusions preferably do not extend inwardly for the full height of panel 116; protrusions 132, 134 are cut away from panel 116 as shown, so that in the updraft mode of combustion (damper in the horizontal position), combusted gas does not stagnate in the rear upper corners of the stove. When portions of protrusions 132, 134 are removed, however, the ears 120, 122 must be added to panel element 116 to maintain a sealing relationship when the damper is in a vertical position. Furthermore, the curvature at the top ear members 120, 122, required to pivot the damper, necessitates downward protrusions (only one downward protrusion 136 is shown) from top panel 12g. Thus, the combined requirements of updraft and horizontal combustion with a rear or top exiting flue collar and a removable damper, in the illustrated heating apparatus of restricted size, require a unique design concept for the cast iron damper.

The protrusions 132, 134, in combination with cup-shaped member 94, according to the preferred embodiment of the invention, capture the damper in a pivoting position. Damper pin protrusions (only pin 140 can be seen in FIGS. 7 and 8) extending from ear members 120, 122 are captured at the upper surface of cup-shaped portion 94 of fireback 52. The pins thus define the longitudinal axis 114 about which the damper rotates.

The stove structure which has been described thus far is directed in particular to a configuration which results in an efficient wood burning apparatus. If one were to use this same structural configuration for burning coal, however, several problems would immediately become apparent. First (referring to FIG. 10), coal requires a grate 140, preferably a "shaker grate", which raises the coal off the bottom frame interior surface so that air, oxygen rich air, can pass through the coal bed from the bottom. Second, coal requires a significantly greater amount of air so that if the parlor stove is set up to be efficient in a wood burning situation, the available oxygen would be insufficient for efficiently burning coal.

Figure 10:
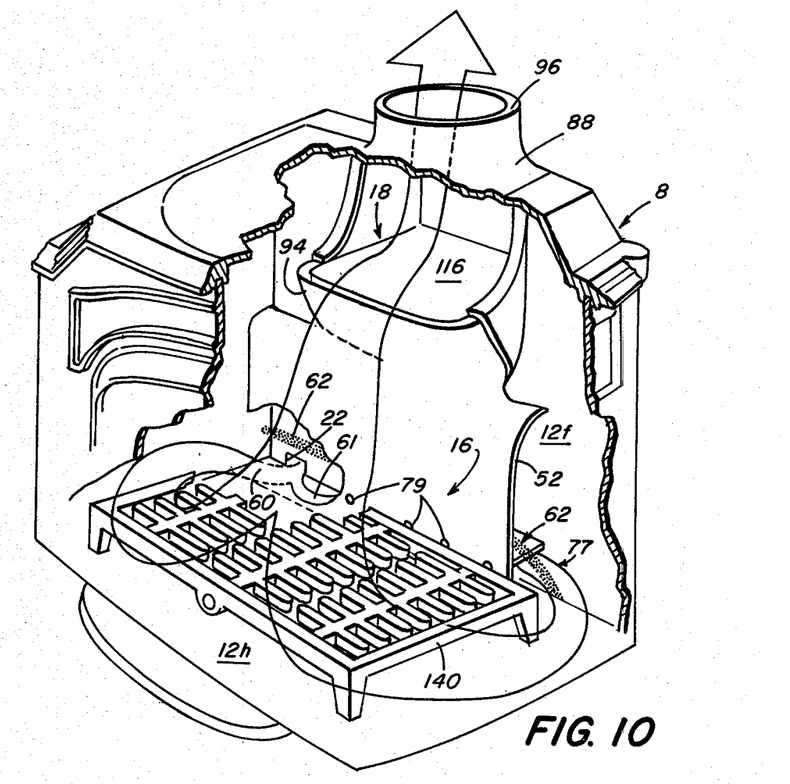
FIG. 10 is a partially cut-away, somewhat schematic perspective view of the preferred embodiment of the heating apparatus in a coal burning configuration.

Referring to FIGS. 3 and 10, the inlet port 22 is therefore formed sufficiently large, beyond that which is necessary for efficient wood burning, so that sufficient air can pass therethrough to burn coal efficiently. Now, however, there is too much air to satisfactorily operate the stove in a wood burning mode. To accomodate both the coal and wood burning modes of operation, the first restriction assembly 68 is introduced in the primary air supply path and the second restriction assembly 77d is introduced into the secondary air supply path for wood burning operation. These restriction assemblies, in the illustrated embodiment, are plate-like elements, illustrated assembly 68 having a single plate integral with wear plate 50 and restriction assembly 77d having first and second cooperating plate-like elements 143, 144 integral with wear plate 54 and baffle 77b respectively. Illustrated lower plate 143 is notched at 77c to allow secondary air to pass into the combustion chamber. Thus, in the wood burning mode of operation, the restriction assemblies act to reduce the otherwise available air flow capacity from inlet port 22, and maintain a level of air flow, for primary and secondary combustion, consistent with efficient wood burning operation. The stove thus operates as described in connection with FIG. 3.

In order to allow sufficient air to enter the primary combustion chamber in the coal burning mode of operation, the restriction assemblies are removed. In the illustrated embodiment, the wear plates 50 and 54 and baffle 77b (and hence integral elements 68, 143, and 144) are removed (whereby the secondary combustion chamber, in the coal burning configuration, no longer exists and), whereby large volumes of air can pass from the inlet port 22 through and around fireback 52, to a now enlarged combustion chamber. Sufficient air is thus provided to the primary combustion chamber to properly maintain the coal in a combusted state. (In the coal burning configuration, damper 18 is always in the horizontal position so that the stove is in an updraft or vertical combustion state.) In the illustrated embodiment, grate 140 is the shaker grate for "shaking" coal in accordance with standard coal burning practice.

When the stove 8, now in a coal burning operating mode, is required to again burn wood, the coal grate 140 is removed and wear plates 50 and 54 and baffle 77b are inserted into and secured by screw connections 58, 59 to the frame. There results a stove which efficiently burns wood in a horizontal combustion mode and a stove which efficiently burns coal in an updraft combustion mode.

In general, the dimensions of the restrictions 68 and 77d are selected experimentally. Generally, the minimum cross-sectional area of the primary path (at notch 66) is less than about one-third, and preferably less than one-fourth the cross-sectional area of the inlet port 22. The minimum cross-sectional area of the secondary air path (notch 77c) is preferably less than one-half the cross-sectional area at notch 66. For the particular stove illustrated in the figures, a stove whose interior width is about 22.5 inches, whose interior depth is about 11 inches, and whose interior height is about 19 inches, and which has a primary combustion chamber for wood burning which is about 18.25 inches in width, the restrictions are sized to provide a restrictive open area in the primary path (notch 66) of approximately 0.8 square inches and in the primary/secondary path (notch 77c) of approximately 0.25 square inches. (There are also the four holes 79 in fireback 52, each having a diameter of approximately ⅜ inches.) The cross-sectional area of the inlet port 22 is approximately 6.25 square inches. In other embodiments, the area of notch 66 is less than two square inches and preferably less than one square inch.

Other embodiments of the invention, including additions, subtractions, deletions, and other modifications of the preferred disclosed embodiment, will be obvious to those practiced in the art and are within the scope of the following claims.

What is claimed is:

1. A method for operating a heating apparatus for burning, in one configuration, coal and in a second configuration, wood, comprising the steps of
providing an inlet port in a frame of the heating apparatus having a cross-sectional area sufficiently large for providing the air required for the heating apparatus to efficiently burn coal, directing said air from said inlet port to a fuel combustion chamber wherein said coal can be efficiently burned, and removably inserting into air supply paths to the fuel combustion chamber, at a position interior of the heating apparatus, and prior to supplying said air to said fuel combustion chamber, removable flow restriction elements for limiting and controlling the rate at which air can be supplied to said fuel combustion chamber when said fuel combustion chamber is employed for burning wood.

2. The method of claim 17 further comprising the step of providing separate primary and secondary air supply paths to said fuel combustion chamber for burning wood, and restricting said air flow in said primary path to said fuel combustion chamber according to said inserting step, to less than one-third of the otherwise available air flow from said inlet port for burning wood.

3. A heating apparatus for burning wood and for burning coal comprising a heat conducting frame member having front, side, and back vertical wall panels, a top panel, and a bottom panel for enclosing a defined volume, a fireback, at least one removable plate for defining in combination with said fireback and at least one of said wall panels a first air supply network for providing air from an inlet port in said frame member to a fuel holding combustion chamber, said air supply network having a first enclosed enlongated path for supplying air at a first side of the apparatus to said fuel holding combustion chamber, said frame member having a flue gas exit aperture in gaseous communication with said fuel holding combustion chamber, and removable restriction means having in an operating position structural connection with said removable plate and with at least one wall of said frame member and having a slot therein, said restriction means interfering in said first enclosed elongated path at a position which is interior of said frame member, and prior to supplying air to said fuel holding chamber, for restricting at said position along said first enclosed elongated path the available cross-sectional area of said enclosed elongated path for controlling the air flow volume through said first path.

4. The heating apparatus of claim 3 wherein said removable restriction means comprises an element for controlling the flow through said first elongated path and wherein said element is integral with said plate.

5. The heating apparatus of claim 4 wherein said air supply network further comprises a second enclosed path defined by and between a said second removable plate, said fireback, a substantially horizontally directed baffle element, and said frame member, for supplying air from said inlet port to a second side of said apparatus, a second removable restriction means for controlling passage of air in said second enclosed path, and said second restriction means have a first element integral with said second plate and a second element integral with said baffle element.

6. The heating apparatus of claim 4 wherein said first elongated path at said first restriction means has a cross-sectional area less than one-third the cross-sectional area of said inlet port.

7. The heating apparatus of claim 6 wherein said first elongated path has a cross-sectional area, at said first restriction means, less than two square inches.

8. The heating apparatus of claim 7 wherein said first elongated path has a cross-sectional area, at said first restriction means, of about 0.8 square inches.

9. The heating apparatus of claim 6 wherein said second elongated path at said second restriction means has a cross-sectional area less than one-half the cross-sectional area of said first elongated path at said first restriction means.

10. The heating apparatus of claim 9 wherein said second enclosed path has a cross-sectional area at said second restriction means of approximately 0.25 square inches.

11. A heating apparatus for burning wood and for burning coal comprising a heat conducting frame member having front, side, and back vertical wall panels, a top panel, and a bottom panel for enclosing a defined volume, an inlet port in said frame member, a fireback, at least one removable wear plate for defining, in combination with said fireback and said frame member, in a first wood burning operating condition, a primary combustion chamber, and further for defining with said fireback and at least one wall panel of said frame member, a primary air supply path to said primary combustion chamber, said primary air supply path being an enclosed elongated path for supplying air from said inlet port to the primary combustion chamber at a first side of the apparatus, said frame member having a flue gas exit aperture for combusted gases, and first removable restriction means having in one operating position structural connection with said wear plate and with at least one wall of said frame member and having a slot therein, said restriction means having, an interference relationship with said enclosed primary air supply path at a position interior of said frame member, and prior to supplying air to said primary combustion chamber, for restricting the quantity of air flow through said enclosed primary air supply path, whereby, in said first position, said apparatus operates to burn wood and whereby with said restriction means removed from the interfering relationship, said heating apparatus operates to burn coal.

12. The heating apparatus of claim 11 wherein said removable restriction means comprises a plate-like element integral with said wear plate, and wherein said apparatus further comprises a secondary air supply path substantially defined by a second wear plate, said fireback, and said frame member, said secondary air supply path having an enclosed elongated path for supplying air from said inlet port to a second side of said apparatus, a second restriction means for restricting passage of air in said secondary air supply path, and said second restriction means being at least partially integral with said second wear plate.

13. The heating apparatus of claim 12 wherein said primary air path at said first restriction means has a cross-sectional area less than one-third the cross-sectional area of said inlet port.

14. The heating apparatus of claim 13 wherein said primary air path has a cross-sectional area, at said first restriction means, less than two square inches.

15. The heating apparatus of claim 14 wherein said primary air path has a cross-sectional area, at said first restriction means, of about 0.8 square inches.

16. The heating apparatus of claim 13 wherein said secondary air path at said second restriction means has a cross-sectional area less than one-half the cross-sectional area of said primary air path at said first restriction means.

17. The heating apparatus of claim 16 wherein said secondary air path has a cross-sectional area at said second restriction means of approximately 0.25 square inches.

18. A heating apparatus for burning wood and coal comprising a heat conducting frame member having front, side, and back vertical wall panels, a top panel, and a bottom panel for enclosing a defined volume, an inlet port in said frame member back panel, a removable fireback, a plurality of removable wear plates having an operative condition within the defined volume and an inoperative condition outside the defined volume, said wear plates, in said operative condition, defining, in combination with said fireback and at least one of said wall panels, an air supply network for providing air from said inlet port in said frame member to a fuel holding combustion chamber, said air supply network having a first enclosed elongated path for supplying air at a first side of said apparatus to said fuel holding combustion chamber and a second enclosed elongated path for supplying air at a second side of said apparatus to said fuel holding combustion chamber, said frame member having a flue gas exit aperture in gaseous communication with said fuel holding combustion chamber, each said wear plate further having integral therewith a restriction element extending, when said wear plates are in said operative condition, into said first and second elongated paths respectively for controlling and reducing an otherwise available flow of air through said first and second elongated paths respectively, whereby said plate-like elements control the flow of air from said inlet port to said fuel holding combustion chamber when said wear plates are in an operative condition.

* * * * *

UNITED STATES PATENT AND TRADEMARK OFFICE
CERTIFICATE OF CORRECTION

PATENT NO. : 4,367,725
DATED : January 11, 1983
INVENTOR(S) : Duncan C. Syme

It is certified that error appears in the above-identified patent and that said Letters Patent are hereby corrected as shown below:

Col. 6, line 27, "combus-" should be --combina---.

Col. 9, line 14, "The method of claim 17" should be --The method of claim 1--.

Signed and Sealed this

Twenty-third Day of August 1983

[SEAL]

Attest:

Attesting Officer

GERALD J. MOSSINGHOFF

Commissioner of Patents and Trademarks